United States Patent
Morein et al.

(10) Patent No.: US 9,448,675 B2
(45) Date of Patent: Sep. 20, 2016

(54) INPUT SENSING USING A GATE SELECT LINE OF A DISPLAY DEVICE

(71) Applicant: SYNAPTICS INCORPORATED, San Jose, CA (US)

(72) Inventors: Stephen L. Morein, San Jose, CA (US); Petr Shepelev, Campbell, CA (US); Joseph Kurth Reynolds, Alviso, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 58 days.

(21) Appl. No.: 14/319,728

(22) Filed: Jun. 30, 2014

(65) Prior Publication Data

US 2015/0309613 A1    Oct. 29, 2015

Related U.S. Application Data

(60) Provisional application No. 61/986,072, filed on Apr. 29, 2014.

(51) Int. Cl.
*G06F 3/041* (2006.01)
*G06F 3/044* (2006.01)

(52) U.S. Cl.
CPC ............. *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 2008/0309627 A1* | 12/2008 | Hotelling | .......... | G02F 1/134363 345/173 |
| 2010/0194698 A1* | 8/2010 | Hotelling | .............. | G06F 1/3218 345/173 |
| 2010/0253638 A1* | 10/2010 | Yousefpor | ............. | G06F 3/0416 345/173 |
| 2014/0111471 A1* | 4/2014 | Zhao | ..................... | G02F 1/3338 345/174 |
| 2014/0176491 A1* | 6/2014 | Zhao | ..................... | G06F 3/0412 345/174 |
| 2015/0049041 A1* | 2/2015 | Yousefpor | ............. | G06F 3/0412 345/174 |

OTHER PUBLICATIONS

U.S. Appl. No. 14/137,481.

* cited by examiner

*Primary Examiner* — Kent Chang
*Assistant Examiner* — Benjamin Morales Fernandez
(74) *Attorney, Agent, or Firm* — Patterson + Sheridan, LLP

(57) ABSTRACT

Embodiments of the present invention generally provide an input device including a display device having an integrated capacitive sensing device. The input device includes a plurality of select line blocks, a plurality of gate low voltage lines, a gate high voltage line coupled to at least one select line included in at least one of the select line blocks, a plurality of transmitter electrodes, and a processing system coupled to the plurality gate low voltage lines and the plurality of transmitter electrodes. Each select line block includes a plurality of select lines. Each gate low voltage line is coupled to a different select line block. The processing system is configured to drive the plurality of transmitter electrodes for capacitive sensing, receive resulting signals from the plurality of gate low voltage lines, and determine positional information based on the resulting signals.

15 Claims, 6 Drawing Sheets

INPUT SENSING USING A GATE SELECT LINE OF A DISPLAY DEVICE

CROSS-REFERENCE TO RELATED APPLICATIONS

This application claims benefit of U.S. provisional patent application Ser. No. 61/986,072, filed Apr. 29, 2014, which is hereby incorporated herein by reference.

BACKGROUND OF THE INVENTION

1. Field of the Invention

Embodiments of the present invention generally relate to techniques for performing input sensing using a gate select line of a display device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes that are configured to both update display lines and transmit and/or receive input sensing signals. In such devices, in order to increase the amount of time available for performing display updating and/or input sensing, display updating and input sensing may be performed simultaneously during the same time periods. However, in such shared electrodes devices, interference may be generated between the display updating and input sensing processes. Such interference may cause inaccurate sensing information to be received, negatively impacting the accuracy of input sensing.

Therefore, there is a need for an improved technique for performing display updating and input sensing in proximity sensor devices.

SUMMARY OF THE INVENTION

Embodiments of the present invention generally provide an input device including a display device having an integrated capacitive sensing device. The input device includes a plurality of select line blocks, a plurality of gate low voltage lines, a gate high voltage line coupled to at least one select line included in at least one of the select line blocks, a plurality of transmitter electrodes, and a processing system coupled to the plurality gate low voltage lines and the plurality of transmitter electrodes. Each select line block includes a plurality of select lines. Each gate low voltage line is coupled to a different select line block. The processing system is configured to drive the plurality of transmitter electrodes for capacitive sensing, receive resulting signals from the plurality of gate low voltage lines while the plurality of transmitter electrodes are being driven for capacitive sensing, and determine positional information based on the resulting signals.

Embodiments of the present invention may further provide a method of input sensing with a display device having an integrated capacitive sensing device and including a plurality of select line blocks, a plurality of gate low voltage lines, each gate low voltage line coupled to a different select line block, a gate high voltage line coupled to at least one select line included in at least one of the select line blocks, and a plurality of transmitter electrodes. The method includes driving the plurality of transmitter electrodes for capacitive sensing, receiving resulting signals from the plurality of gate low voltage lines while the plurality of transmitter electrodes are being driven for capacitive sensing, and determining positional information based on the resulting signals.

Embodiments of the present invention may further provide a processing system for a display device having an integrated sensing device. The processing system includes a driver module having driver circuitry, a receiver module configured for coupling to a plurality of gate low voltage lines, and a determination module. The driver module is configured for coupling to a plurality of select line blocks, the plurality of gate low voltage lines, a gate high voltage line coupled to at least one select line included in at least one of the select line blocks, and a plurality of transmitter electrodes. Each gate low voltage line is coupled to a different select line block. The driver module is configured for driving the plurality of transmitter electrodes for capacitive sensing. The receiver module is configured for receiving resulting signals from the plurality of gate low voltage lines while the plurality of transmitter electrodes are being driven for capacitive sensing. The determination module is configured to determine positional information based on the resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for performing input sensing using a gate select line included in an integrated input device. Gate select lines used to select subpixels for display updating may be used to receive input sensing signals. In order to reduce interference with display updating, during input sensing, the gate select lines may be held at a gate low voltage such that transistor gates associated with the corresponding subpixels remain closed during input sensing. Additionally, in order to reduce the effects of display updating on the accuracy of input sensing, the gate select lines may be coupled to a receiver module via one or more switching mechanisms. In some embodiments, the switching mechanisms may allow the number of gate select lines coupled to the receiver module to be modified depending on how many gate select lines are being used for display updating. Advantageously, the system and method described herein enable accurate input sensing to be performed with gate select lines while simultaneously performing display updating.

Figure 1:
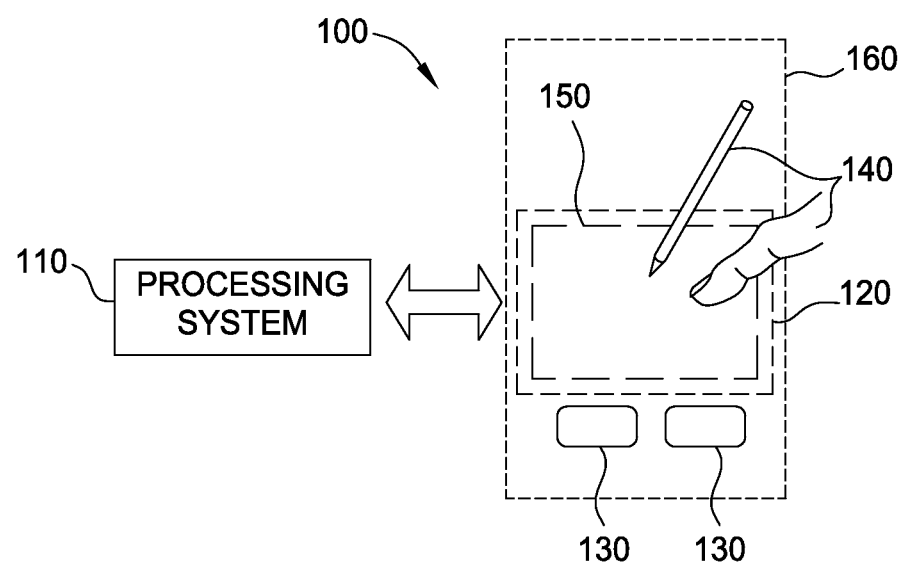
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., also referred to as a "V-com electrode" or segments of a segmented V-com electrode) used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
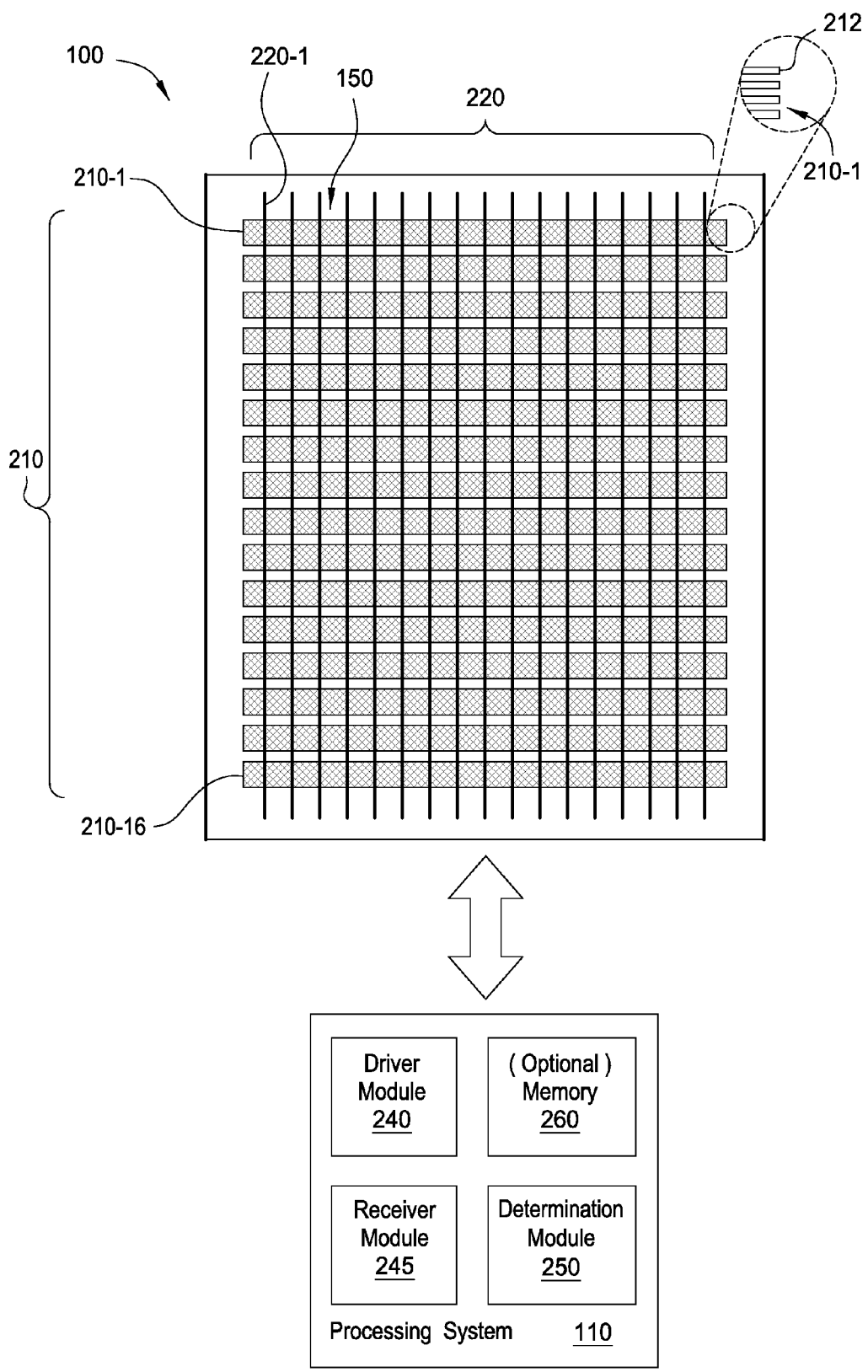
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes 212, such as one or more segments of a Vcom electrode, a source line, select line, an anode sub-pixel electrode, cathode pixel electrode, or any other display element that is used for both display updating and input sensing. Additionally, each receiver electrode 220 may comprise one or more common electrodes (e.g., gate select lines used for display updating). Further, both the transmitter electrodes 210 and the receiver electrodes 220 may include one or more common electrodes 212, such as common electrodes disposed on the TFT substrate and/or color filter glass. Although the transmitter electrodes 210 and receiver electrodes 220 are illustrated as being rectangular, in other embodiments, the transmitter electrodes 210 and receiver electrodes 220 may be any practical geometric shape. The processing system 110 is coupled to the array of sensing elements 150, for example, through one or more routing traces (not shown).

Although the processing system 110 is illustrated in FIG. 2 embodied as a single integrated circuit (IC) (e.g., an integrated controller), the processing system 110 may include any appropriate number of ICs. As shown in FIG. 2, the processing system 110 may include a driver module 240, a receiver module 245, a determination module 250, an optional memory 260, and/or a synchronization mechanism (not shown in FIG. 2).

The driver module 240 includes driver circuitry and may be configured for updating images on the display screen of the display device 160. For example, the driver circuitry may be configured to drive gate select lines and/or apply one or more pixel voltages to the display pixel electrodes through pixel source drivers. The driver circuitry may also be configured to apply one or more common drive voltages to the common electrodes 212 to update one or more display lines of the display screen. In addition, the processing system 110 may be configured to operate the common electrodes 212 as transmitter electrodes 210 for input sensing by driving transmitter signals onto the common electrodes 212.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In some embodiments, the receiver module 245 is configured to receive resulting signals while the processing system 110 is not actively transmitting input sensing signals with the transmitter electrodes 210. For example, during such time periods, the receiver electrodes 220 may be configured to receive noise (e.g., to determine a baseline interference value) and/or a signal from an active input object 140 capable of transmitting a transmitter signal, such as an active pen capable of transmitting an active pen signal. Additionally, the receiver module 245 and/or driver module 240 may be configured to drive a signal (e.g., a gate voltage low ($V_{GL}$) signal, reference signal, etc.) onto one or more sensing elements 150 to detect changes in capacitance (e.g., absolute capacitance or transcapacitance) of the sensing element 150 due to the presence of an input object 140.

The functions of the processing system 110 may be implemented in more than one IC to control the display device 160 elements (e.g., common electrodes 212) and drive transmitter signals and/or receive resulting signals received from the array of sensing elements 150. For example, one IC may be configured to perform input sensing and another IC may be configured to perform display updating. In other embodiments, one IC may be configured to perform the functions of the driver module 240, and another IC may be configured to perform the functions of the receiver module 245. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include matrix sensors, the term "capacitive pixels" may refer to the localized capacitance (e.g., absolute capacitance) between a sensing element 150 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensing elements 150 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 3:
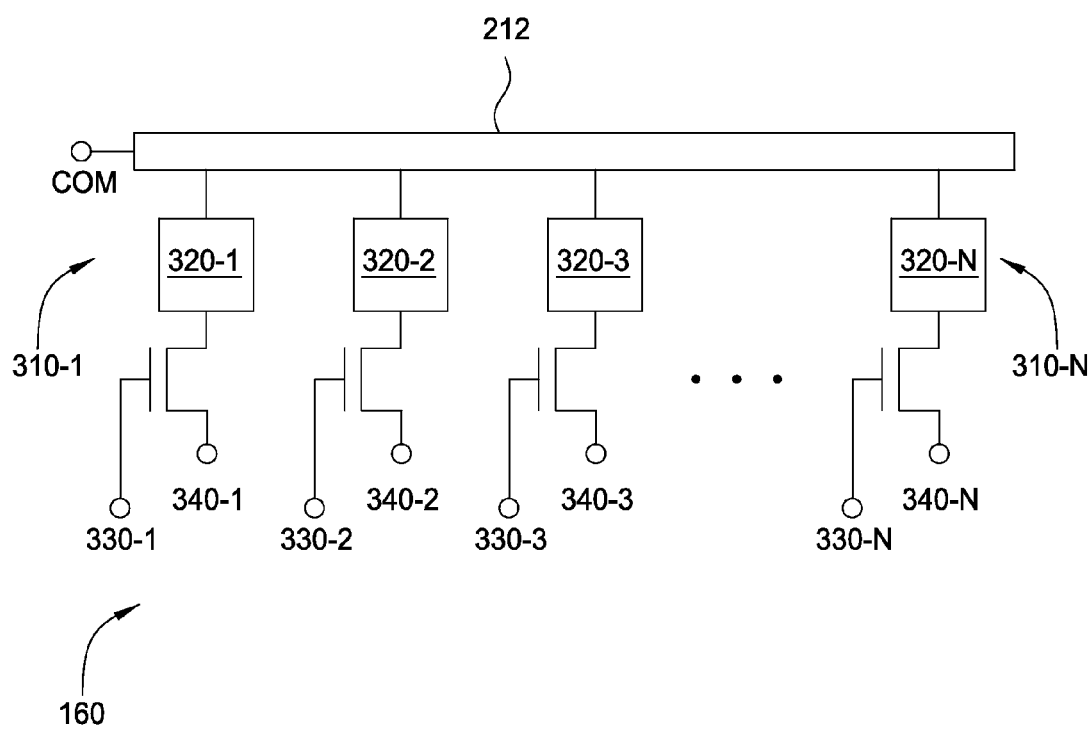
FIG. 3 is a partial schematic view of the display device coupled to a common electrode in the input device of FIG. 2.

FIG. 3 is a partial schematic view of the display device 160 coupled to a common electrode 212 in the input device 100 of FIG. 2. The display device 160 includes a plurality of display rows 310 (e.g., N display rows), with each display row 310 including a plurality of sub-pixels 320 and sub-pixel circuitry configured for display updating. For example, subpixel 320-1 may be included in a first display row 310, subpixel 320-1 may be included in a second display row 310, and subpixel 320-3 may be included in a third display row 310. The sub-pixel circuitry associated with each sub-pixel 320 may include a select line 330 (e.g., 330-1, 330-2, 330-3, . . . , 330-N) and a source line 340 (e.g., 340-1, 340-2, 340-3, . . . , 340-N). A select signal may be received by a select line 330 to select one or more sub-pixels 320 for display updating. The selected sub-pixel(s) 320 may then be driven with a source voltage received by the source line 340-N and/or a common voltage received by the common electrode 212.

Although the embodiment illustrated in FIG. 3 includes a separate select line 330 for each sub-pixel 320, in other embodiments, each select line 330 may be configured to select more than one sub-pixel 320 at a time. For example, in one embodiment, a select line 330 may select an entire display row 310 for updating (e.g., a display row 310 including sub-pixel 320-1). In other embodiments, a select line 330 may select one or more types of sub-pixels 320, for example, sub-pixels 320 associated with a specific pixel color component (e.g., red, green, blue, yellow, white, etc.) or sub-pixels which comprise one or more pixels.

Once a sub-pixel 320 is selected, a source voltage may be received by the source line 340 to charge the sub-pixel to a predetermined level (e.g., a target voltage or current). The predetermined level may be associated with a desired brightness level of the sub-pixel 320. In other embodiments, one or more sub-pixels 320 may be coupled to a single source line 340 (e.g., through a logic circuit) in order to enable the one or more sub-pixels 320 to be charged to the same predetermined level. In various embodiments, the source voltage may be a substantially constant voltage. In other embodiments, the source voltage may transition between at least two voltages.

The common electrode 212 may be configured to provide a common voltage to the sub-pixels 320. Although the common electrode 212 is illustrated as a single, continuous electrode, in other embodiments, the common electrode 212 may be divided into a plurality of segments, with each segment providing a common voltage to one or more sub-pixels 320. Additionally, in various embodiments, the common electrode 212 may be configured to serve as a transmitter electrode 210 or receiver electrode 220 that performs transcapacitive sensing, absolute sensing, or matrix sensing.

As described above, in addition to configuring common electrodes 212 to serve as transmitter electrodes 210 and/or receiver electrodes 220, other display elements, such as select lines 330, may be configured to serve as receiver electrodes 220. By configuring input device 100 components to perform multiple functions—instead of using dedicated components that perform a single function—the number of components included in the input device 100 may be reduced, enabling smaller and thinner form factors. However, using display elements such as select lines 330 to perform input sensing presents certain challenges.

In general, performing display updating with select lines 330 while simultaneously operating the select lines 330 to receive resulting signals for inputting sensing may negatively impact the accuracy of input sensing. For example, when a select line 330 is being driven to select a row of subpixels for display updating, that select line 330 may transmit inaccurate input sensing information (e.g., resulting signals), or be unable to transmit any input sensing information, to the receiver module 245, causing incorrect positional information to be determined. Accordingly, when select lines 330 are configured to serve as receiver electrodes 220, various techniques may be used to compensate for interference and resource conflicts between display updating and input sensing, as described below in further detail in conjunction with FIGS. 4-6.

Performing Input Sensing Using a Gate Select Line of a Display Device

Figure 4:
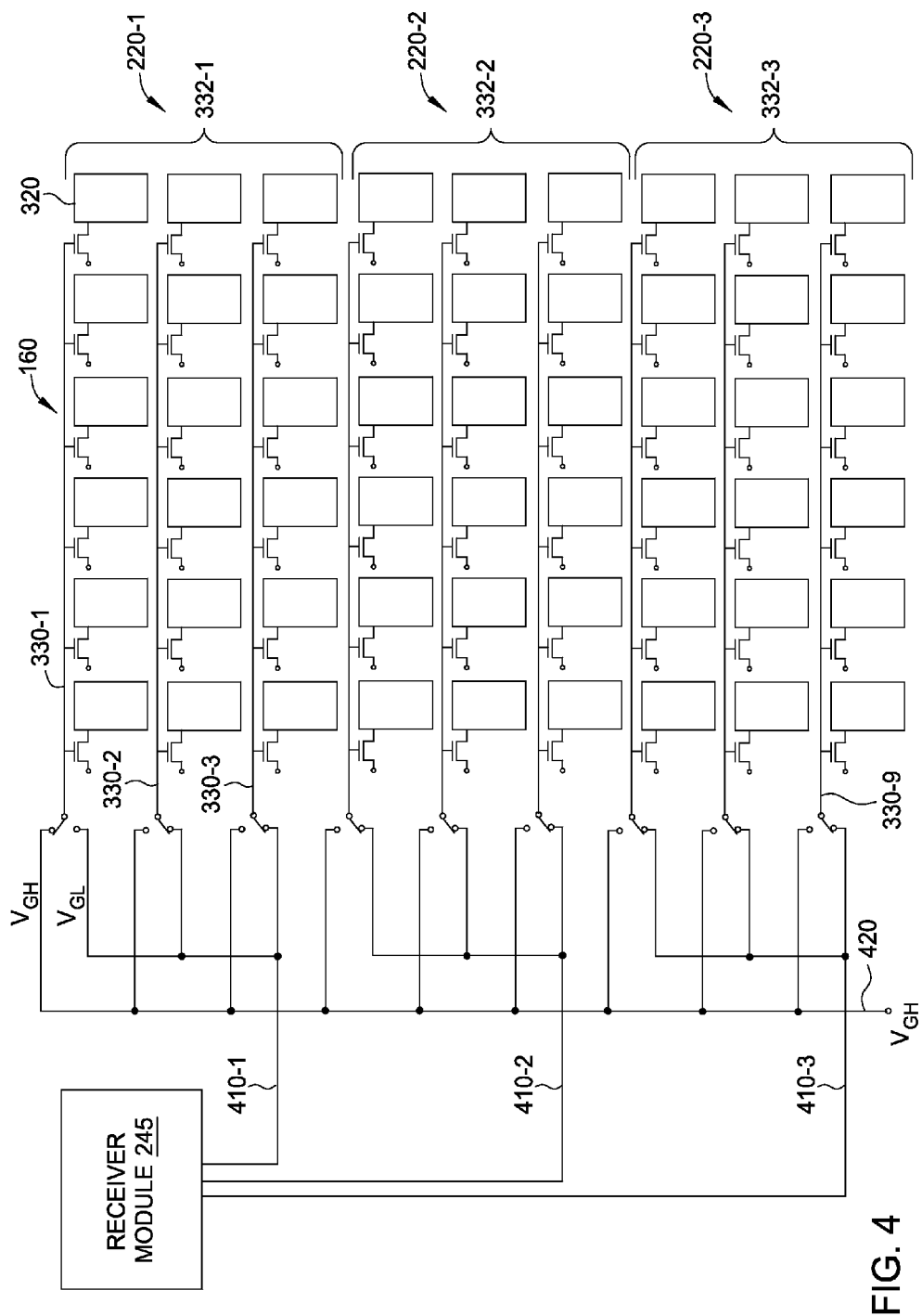
FIG. 4 illustrates a partial schematic plan view of select lines configured to be switched between the receiver module and a gate high voltage ($V_{GH}$) line in accordance with embodiments of the invention.

FIG. 4 illustrates a partial schematic plan view of select lines 330 configured to be switched between the receiver module 245 and a gate high voltage ($V_{GH}$) line in accordance with embodiments of the invention. During display updating, select lines 330 are switched between a gate low voltage ($V_{GL}$) and a gate high voltage ($V_{GH}$). When a select line 330 (e.g., select line 330-2) is switched to $V_{GL}$, the subpixel transistor gate(s) coupled to the select line 330 are closed, preventing a voltage from being applied to the subpixels 320 via the source lines 340. When a select line 330 (e.g., select line 330-1) is switched to $V_{GH}$, however, the subpixel transistor gate(s) coupled to the select line 330 are open, allowing the row of subpixels 320 to be updated via the source lines 340. As such, in various embodiments, when the select lines 330 are coupled to the receiver module 245 and configured to operate as receiver electrodes 220, the receiver module 245 and/or the driver module 240 may hold the select lines 330 at $V_{GL}$. By holding the select lines 330 at $V_{GL}$, the subpixel transistor gates associated with the select lines 330 remain closed while the select lines 330 are used to receive resulting signals. In some embodiments, the select lines 330 may be operated for transcapacitance sensing. For example, the processing system 110 may detect the presence or absence of an input object 140 by determining how much charge is needed to restore the select lines 330 to $V_{GL}$, for example, when the select lines 330 are discharged due to a capacitive coupling formed with an input object 140.

As shown in FIG. 4, the select lines 330 may be divided into select line blocks 332, each of which may correspond to a different receiver electrode 220. For example, select lines 330-1, 330-2, and 330-3 may correspond to receiver electrode 220-1, select lines 330-4, 330-5, and 330-6 may correspond to receiver electrode 220-2, and so on. Although the select lines 330 shown in FIG. 4 are physically segmented into select line blocks 332 (e.g., by coupling the select lines 330 to different $V_{GL}$ lines 410), in other embodiments, the select lines 330 may be divided into select line blocks 332 programmatically, such as by using logic included in the processing system 110.

Each select line block 332 may be coupled to the receiver module 245 via a different $V_{GL}$ line 410 (e.g., 410-1, 410-2, and 410-3). Thus, the receiver module 245 may receive distinct resulting signals from each select line block 332. For simplicity of illustration, each of the select line blocks 332 shown in FIG. 4 includes only three select lines 330. However, in other embodiments, the select line blocks 332 may include a greater or lesser number of select lines 330. For example, in some embodiments, each select line block 332 may include approximately thirty select lines 330. In other embodiments, any number of select lines 330 (e.g., 8, 16, 32, 64, etc.) may be included in a select line block 332. Additionally, in some embodiments, different select line blocks 332 may include different numbers of select lines 330.

Any appropriate number of $V_{GL}$ lines 410 may be used to couple the select lines 330 to the receiver module 245. In some embodiments, the number of $V_{GL}$ lines 410 is equal to the number of receiver electrodes 220. Further, although only a single $V_{GH}$ line 420 is shown, any appropriate number of $V_{GH}$ lines 420 may be used to select rows of subpixels 320 for display updating.

During display updating, one or more select lines 330 may be switched from a $V_{GL}$ line 410 to the $V_{GH}$ line 420 in order to select the corresponding row of subpixels 320 for updating. In general, select lines 330 that are switched to the $V_{GH}$ line 420 are unable to pass resulting signals to the receiver module 245. Consequently, when display updating is performed with a select line 330 included in a particular select line block 332, the magnitude of the resulting signals that are received from that select line block 332 may be reduced. For example, if a select line block 332 includes thirty select lines, and one select line 330 is coupled to the $V_{GH}$ line 420 for display updating, the strength of the resulting signals may change by approximately 1/30. In order to reduce the likelihood that the processing system 110 (e.g., the determination module 250) will erroneously attribute this change in signal strength to the presence or absence of an input object 140, the processing system 110 may be capable of detecting that one or more select lines 330 are coupled to the $V_{GH}$ line 420 and, in response, applying a compensation algorithm to the resulting signals. For example, if a single select line 330 is being used for display updating, the compensation algorithm may increase the magnitude of the resulting signals by a factor of 30/29 to compensate for the missing select line 330. As a result, the accuracy of input sensing may be increased.

Under certain circumstances, however, the processing system 110 may be unable to determine an appropriate compensation algorithm to apply to the resulting signals received from a select line block 332 that is being used for display updating. For example, if the signals being received from each select line 330 are not substantially equal—for example, due to the presence of an input object 140 proximate to some, but not all, select lines 330—then, in the example provided above, increasing the magnitude of the resulting signals in a proportional manner may produce inaccurate results. Accordingly, in some embodiments, the processing system 110 may use less than all of the select lines 330 included in the select line blocks 332 to acquire resulting signals. For example, if no more than two select lines 330 are used for display updating during normal operation of the input device 100, then the processing system 110 may receive resulting signals from only 28 out of 30 select lines 330 included in each select line block 332. In such embodiments, the processing system 110 may include logic that tracks how many select lines 330, if any, are coupled to the $V_{GH}$ line 420 for display updating. One or more select lines 330 may then be coupled to, or decoupled from, the receiver module 245 such that resulting signals are consistently received from only 28 select lines 330. Thus, resulting signals may be received from the same number of select lines 330 each time a receiver electrode 220 is used for input sensing. This technique is described below in further detail in conjunction with FIG. 5.

Figure 5:
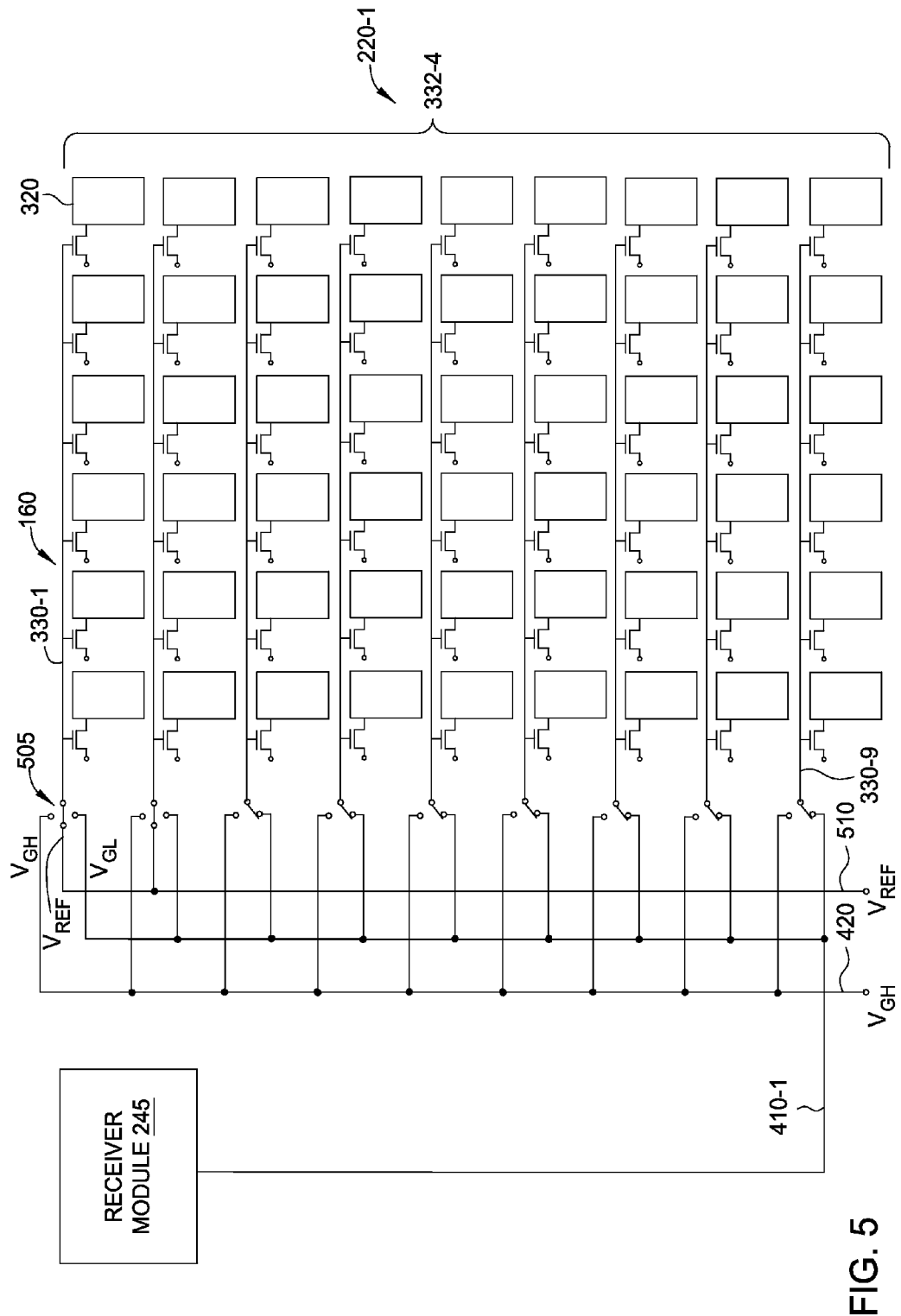
FIG. 5 illustrates a partial schematic plan view of a select line block that includes two select lines configured to be coupled to a reference voltage ($V_{REF}$) line in accordance with embodiments of the invention.

FIG. 5 illustrates a partial schematic plan view of a select line block 332 that includes two select lines 330 configured to be coupled to a reference voltage ($V_{REF}$) line 510 in accordance with embodiments of the invention. As shown, one or more of the select line blocks 332 included in the input device 100 may include additional switches 505 than enable one or more select lines 330 to be coupled to a $V_{REF}$ line 510 such that resulting signals are not received from the select lines 330. The number of additional switches may be equal to the maximum number of select lines 330 that are simultaneously used for display updating during normal operation of the input device 100. In some embodiments, the $V_{REF}$ line 510 may be configured to hold the select lines 330 at a voltage that is substantially the same as $V_{GL}$. Accordingly, when zero or more select lines 330 are coupled to the $V_{REF}$ line 510, the select lines 330 are not used for input sensing, and the corresponding subpixel gate transistors remain closed.

As described above, the additional switches 505 enable the receiver module 245 to consistently receive resulting signals from the same or substantially the same number of select lines 330, even when one or more select lines 330 included in the select line block 332 are being used for display updating. For example, if one select line 330 included in select line block 332-4 is being used for display updating, then one of the switches 505 may couple an associated select line 330 to the $V_{REF}$ line 510, and one of the switches 505 may couple an associated select line 330 to the $V_{GL}$ line 410-1. If two select lines 330 included in select line block 332-4 are being used for display updating, then both of the switches 505 may couple associated select lines 330 to the $V_{GL}$ line 410-1. Further, if none of the select lines 330 included in select line block 332-4 are being used for display updating, then both of the switches 505 may couple associated select lines 330 to the $V_{REF}$ line 510. Thus, the number of select lines 330 coupled to the receiver module 245 via the $V_{GL}$ line 410-1 may be held constant, enabling more accurate input sensing to be performed.

Figure 6:
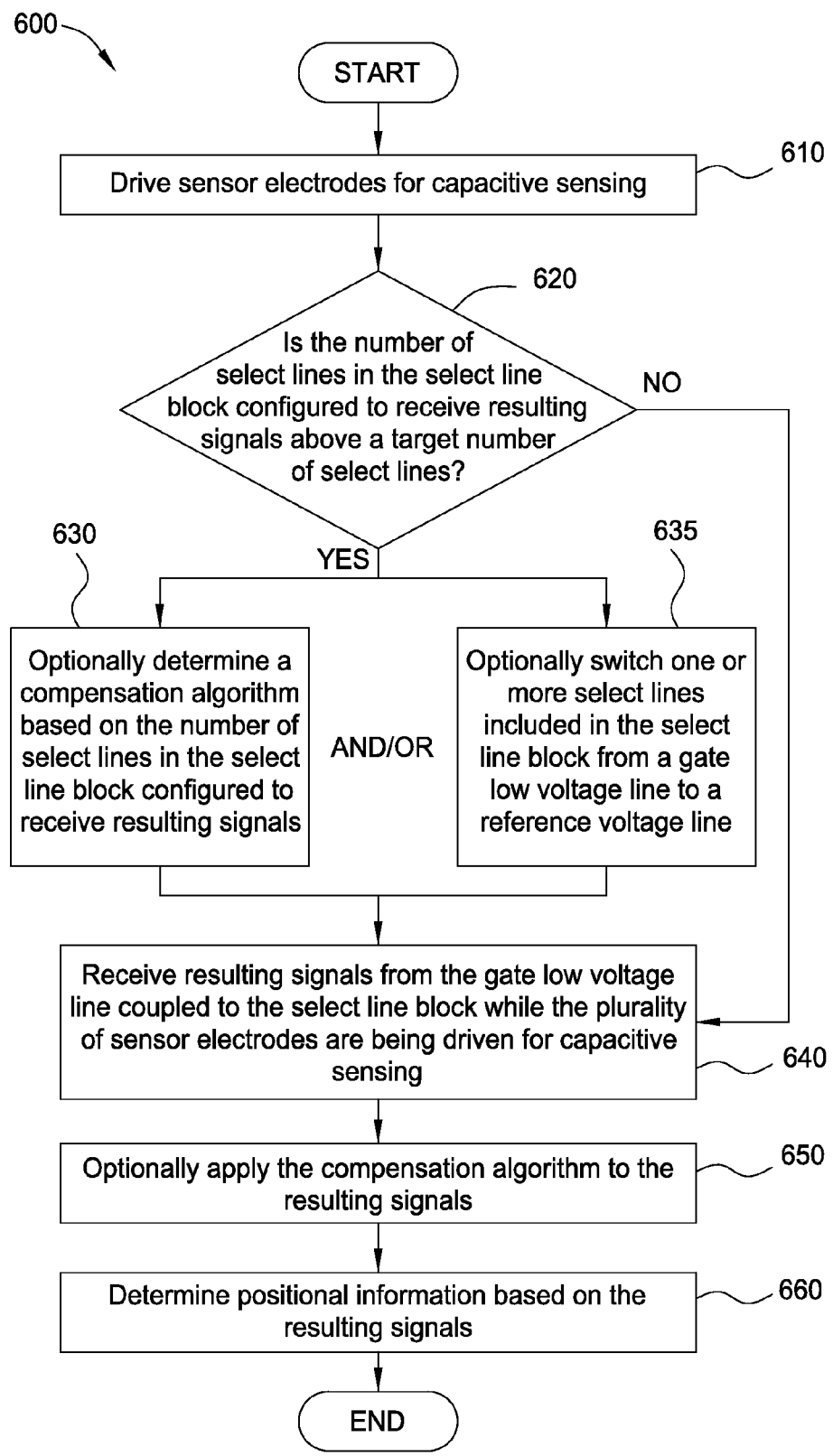
FIG. 6 is a flow chart of a method for performing input sensing using a select line included in the input device in accordance with embodiments of the invention.

FIG. 6 is a flow chart of a method 600 for performing input sensing using a select line 330 included in the input device 100 in accordance with embodiments of the invention. Although the method 600 is described in conjunction with FIGS. 1-5, persons skilled in the art will understand that any system configured to perform the method, in any appropriate order, falls within the scope of the present invention.

The method 600 begins at step 610, where the driver module 240 drives one or more sensor electrodes (e.g., transmitter electrodes 210) for input sensing. At step 620, the processing system 110 optionally determines whether the number of select lines 330 included in a particular select line block 332 is above a target number of select lines 330. As described above, when display updating and input sensing are performed simultaneously, the number of select lines 330 available for input sensing in a given select line block 332 may vary depending on whether one or more of the select lines 330 are being used for display updating. Accordingly, the processing system 110 may track and control the number of select lines 330 from which the receiver module 245 receives resulting signals so that the number of select lines 330 remains constant. If the number of select lines 330 is not above the target number of select lines 330 (e.g., 28 select lines, as described above), then the method 600 proceeds to step 640. If the number of select lines 330 is above the target number of select lines 330, then the method 600 may proceed to step 630 and/or step 635.

At step 630, the processing system 110 optionally determines a compensation algorithm to apply to the resulting signals received by the receiver module 245. The compensation algorithm may be based on the number of select lines 330 that are coupled to the $V_{GL}$ line 410 associated with the select line block 332. At step 635, the processing system 110 optionally switches (e.g., via a switch 505) one or more select lines 330 included in the select line block 332 from the $V_{GL}$ line 410 to the $V_{REF}$ line 510. The number of select lines 330 that are switched from the $V_{GL}$ line 410 to the $V_{REF}$ line 510 may be equal to a number of select lines 330 that need to be decoupled from the $V_{GL}$ line 410 to reach the target number of select lines 330.

Next, at step 640, resulting signals may be received by the receiver module 245 via the select lines 330 while the sensor electrodes are being driven for input sensing. At step 650, the processing system 110 optionally applies a compensation algorithm to the resulting signals, for example, to compensate for a deviation from the target number of select lines 330 from which resulting signals are being received. At step 660, the determination module 250 determines positional information, such as the presence and location of an input object 140, based on the resulting signals. The method 600 then returns to step 610, where a select line block 332 associated with the next receiver electrode 220 may be operated for input sensing.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. An input device comprising a display device having an integrated capacitive sensing device, the input device comprising:
    a plurality of select line blocks, each select line block comprising a plurality of select lines;
    a plurality of gate low voltage lines, each gate low voltage line coupled to a different select line block;
    a gate high voltage line coupled to at least one select line included in at least one of the select line blocks;

a plurality of transmitter electrodes; and a processing system coupled to the plurality gate low voltage lines and the plurality of transmitter electrodes, the processing system configured to:
- drive the plurality of transmitter electrodes for capacitive sensing;
- receive resulting signals from the plurality of gate low voltage lines while the plurality of transmitter electrodes are being driven for capacitive sensing; and determine positional information based on the resulting signals, wherein the processing system is further configured to:
- switch a first select line included in a first select line block from a first gate low voltage line to the gate high voltage line to select a sub-pixel for display updating;
- drive a source line coupled to the sub-pixel to update the sub-pixel while the sub-pixel is selected; and
- based on determining that the processing system is unable to receive resulting signals for capacitive sensing from the first select line, apply a compensation algorithm to the resulting signals.

2. The input device of claim 1, wherein the processing system receives the resulting signals from the first gate low voltage line while the first select line is switched to the gate high voltage line.

3. An input device comprising a display device having an integrated capacitive sensing device, the input device comprising:
- a plurality of select line blocks, each select line block comprising a plurality of select lines;
- a plurality of gate low voltage lines, each gate low voltage line coupled to a different select line block;
- a gate high voltage line coupled to at least one select line included in at least one of the select line blocks;
- a plurality of transmitter electrodes; and
- a processing system coupled to the plurality gate low voltage lines and the plurality of transmitter electrodes, the processing system configured to:
  - drive the plurality of transmitter electrodes for capacitive sensing;
  - receive resulting signals from the plurality of gate low voltage lines while the plurality of transmitter electrodes are being driven for capacitive sensing; and determine positional information based on the resulting signals, wherein the processing system is further configured to:
  - switch a first select line included in a first select line block from a first gate low voltage line to the gate high voltage line to select a sub-pixel for display updating;
  - drive a source line coupled to the sub-pixel to update the sub-pixel while the sub-pixel is selected; and
  - based on determining that a number of select lines included in the first select line block configured to receive resulting signals for capacitive sensing is above a target number of select lines, switch one or more select lines included in the first select line block from the first gate low voltage line to a reference voltage line.

4. The input device of claim 3, wherein the processing system is further configured to drive the first gate low voltage line and the reference voltage line with substantially the same voltage.

5. The input device of claim 1, wherein the processing system is further configured to:
- determine a number of select lines included in a first select line block that are switched to the gate low voltage line; and
- based on the number of select lines, switch one or more select lines included in the first select line block from a first gate low voltage line to a reference voltage line.

6. The input device of claim 1, further comprising, for each select line block, a switch coupled to at least one select line included in the select line block, wherein the switch is configured to switch the at least one select line between a gate low voltage line and a reference voltage line.

7. A method of input sensing with a display device having an integrated capacitive sensing device and including a plurality of select line blocks, a plurality of gate low voltage lines, each gate low voltage line coupled to a different select line block, a gate high voltage line coupled to at least one select line included in at least one of the select line blocks, and a plurality of transmitter electrodes, the method comprising:
- driving the plurality of transmitter electrodes for capacitive sensing;
- receiving resulting signals from the plurality of gate low voltage lines while the plurality of transmitter electrodes are being driven for capacitive sensing;
- determining positional information based on the resulting signals;
- switching a first select line included in a first select line block from a first gate low voltage line to the gate high voltage line to select a sub-pixel for display updating;
- driving a source line coupled to the sub-pixel to update the sub-pixel while the sub-pixel is selected; and
- based on determining that the first gate low voltage line is unable to receive resulting signals for capacitive sensing from the first select line, applying a compensation algorithm to the resulting signals.

8. The method of claim 7, further comprising receiving the resulting signals from the first gate low voltage line while the first select line is switched to the gate high voltage line.

9. The method of claim 7, further comprising, based on determining that a number of select lines included in the first select line block configured to receive resulting signals for capacitive sensing is above a target number of select lines, switching one or more select lines included in the first select line block from the first gate low voltage line to a reference voltage line.

10. The method of claim 9, further comprising driving the first gate low voltage line and the reference voltage line with substantially the same voltage.

11. The method of claim 7, further comprising:
- determining a number of select lines included in a first select line block that are switched to the gate low voltage line; and
- based on the number of select lines, switching one or more select lines included in the first select line block from a first gate low voltage line to a reference voltage line.

12. The method of claim 7, further comprising, for each select line block, coupling a switch to at least one select line included in the select line block, wherein the switch is configured to switch the at least one select line between a gate low voltage line and a reference voltage line.

13. A processing system for a display device having an integrated sensing device, the processing system comprising:
- a driver module comprising driver circuitry, the driver module configured for coupling to a plurality of select line blocks, a plurality of gate low voltage lines, each gate low voltage line coupled to a different select line block, a gate high voltage line coupled to at least one select line included in at least one of the select line blocks, and a plurality of transmitter electrodes, the driver module configured for driving the plurality of transmitter electrodes for capacitive sensing;

a receiver module configured for coupling to the plurality of gate low voltage lines, the receiver module configured for receiving resulting signals from the plurality of gate low voltage lines while the plurality of transmitter electrodes are being driven for capacitive sensing; and a determination module configured to determine positional information based on the resulting signals; wherein the driver module is further configured for:

determining a number of select lines included in a first select line block that are configured to receive resulting signals for capacitive sensing; and based on the number of select lines, switching one or more select lines included in the first select line block from a first gate low voltage line to a reference voltage line.

14. The processing system of claim 13, wherein the driver module is further configured for:

switching a first select line included in a first select line block from a first gate low voltage line to the gate high voltage line to select a sub-pixel for display updating; and driving a source line coupled to the sub-pixel to update the sub-pixel while the sub-pixel is selected.

15. The processing system of claim 14, wherein the determination module is further configured for, based on determining that resulting signals are not being received from the first select line, applying a compensation algorithm to the resulting signals.

\* \* \* \* \*